United States Patent [19]
Hsu

[11] Patent Number: 6,101,925
[45] Date of Patent: Aug. 15, 2000

[54] HUMIDITY DEVICE FOR OVEN

[75] Inventor: Tony Hsu, Yung Kang, Taiwan

[73] Assignee: Lundar Electric Industrial Co., Ltd., Tainan Hsien, Taiwan

[21] Appl. No.: 09/416,422

[22] Filed: Oct. 12, 1999

[51] Int. Cl.[7] .............................. A47J 27/00; A47J 27/04; A47J 37/00; A47J 37/04; A23L 1/00

[52] U.S. Cl. ................. 99/330; 99/339; 99/467; 99/468; 99/476; 99/483; 99/516; 219/401

[58] Field of Search ............................. 99/325–332, 339, 99/340, 400, 401, 444–450, 467, 468, 473–476, 470, 483, 516, 534, 536; 126/21 A, 20, 20.1, 20.2, 369, 369.1; 219/401, 400, 682, 756, 759, 444, 442, 385, 386; 426/510, 511, 523, 407

[56] References Cited

U.S. PATENT DOCUMENTS

| 4,430,557 | 2/1984 | Eichelberger et al. ............... 99/340 X |
|---|---|---|
| 4,722,268 | 2/1988 | Rightley ................................. 99/468 |
| 4,810,856 | 3/1989 | Jovanovic ............................... 219/401 |
| 4,817,582 | 4/1989 | Oslin et al. ........................... 99/474 X |
| 4,851,644 | 7/1989 | Oslin ................................. 219/401 X |
| 4,924,072 | 5/1990 | Oslin ................................. 219/492 X |
| 5,025,132 | 6/1991 | Fortmann et al. ................. 392/399 X |
| 5,080,087 | 1/1992 | McFadden et al. ....................... 126/20 |
| 5,164,161 | 11/1992 | Feathers et al. .................... 219/401 X |
| 5,272,963 | 12/1993 | Del Fabbro ............................... 99/468 |
| 5,365,039 | 11/1994 | Chaudoir .................................. 99/468 |
| 5,515,773 | 5/1996 | Bullard .................................... 99/330 |
| 5,545,874 | 8/1996 | Hansson ............................... 126/21 A |

*Primary Examiner*—Timothy Simone

[57] ABSTRACT

A humidity device for an oven is composed of a reservoir in the oven having connected at its bottom to one end of a heating piper, the other end of the heating pipe is connected to a first end of a universal coupling which has a second end connected to the top of the reservoir, respectively, while a third end of the universal coupling is connected to a nozzle pipe, wherein the heating pipe is capable of vaporizing water flow in the pipe and the vapor goes through third end of the universal coupling into the nozzle pipe and spreading into the oven, whereas the water drops are collected by the reservoir through the second end of the heating pipe.

3 Claims, 2 Drawing Sheets

HUMIDITY DEVICE FOR OVEN

FIELD OF THE INVENTION

This invention relates to a humidity device for an oven, and more particularly to introduce vapor into the oven and to lead water drops into the reservoir.

BACKGROUND OF THE INVENTION

The conventional oven is convenient, however, the food after heating by the oven is too dried to serve people.

In view of this, the inventor has invented a prior invention which has attached a humidity device to the oven, however, the device can not prevent water from spreading into the oven. In this case, cold water dropping on the food (such as chicken) causes the food to crack or even oil to spread out everywhere.

SUMMARY OF THE INVENTION

It is the primary object of the present invention to provide a humidity device, which is safe in operation and to prepare food in a more attractive appearance.

It is another object of the present invention to provide a humidity device for an oven, which is able to maintain a clean cooking place.

DETAILED DESCRIPTION OF THE PREFERRED EMBOIDMENT

Figure 1:
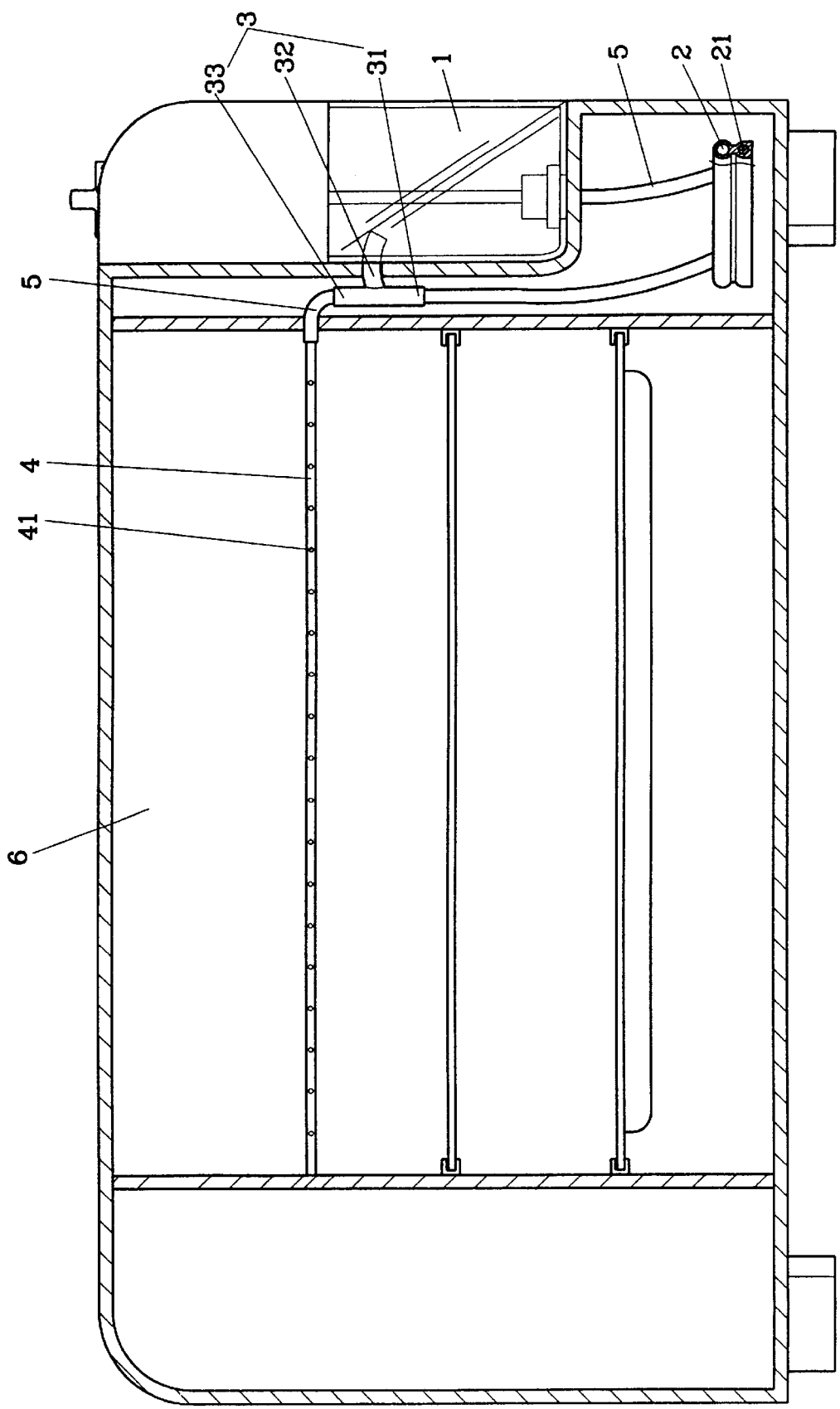
FIG. 1 is a side cross sectional view of the present invention.

The present invention, as shown in FIG. 1, comprises a reservoir 1, a heating pipe 2, a universal coupling 3, a nozzle pipe 4, and heat preventive couplings 5.

The reservoir 1 is attached to an oven 6 with its bottom connected to one end of the heating pipe 2 which has its the other end connected to a first end 31 of the universal coupling 3. A second end 32 of the universal coupling 3 is connected to the top of the reservoir 1. While a third end 33 of the universal coupling 3 is connected to the nozzle pipe 4. The nozzle pipe 4 is located in the oven 6 (the best position will be at two third of the height within the oven) composed of plural holes 41, and the heating pipe 2 has a heater 21 which vaporized water flows through the heating pipe 2.

Figure 2:
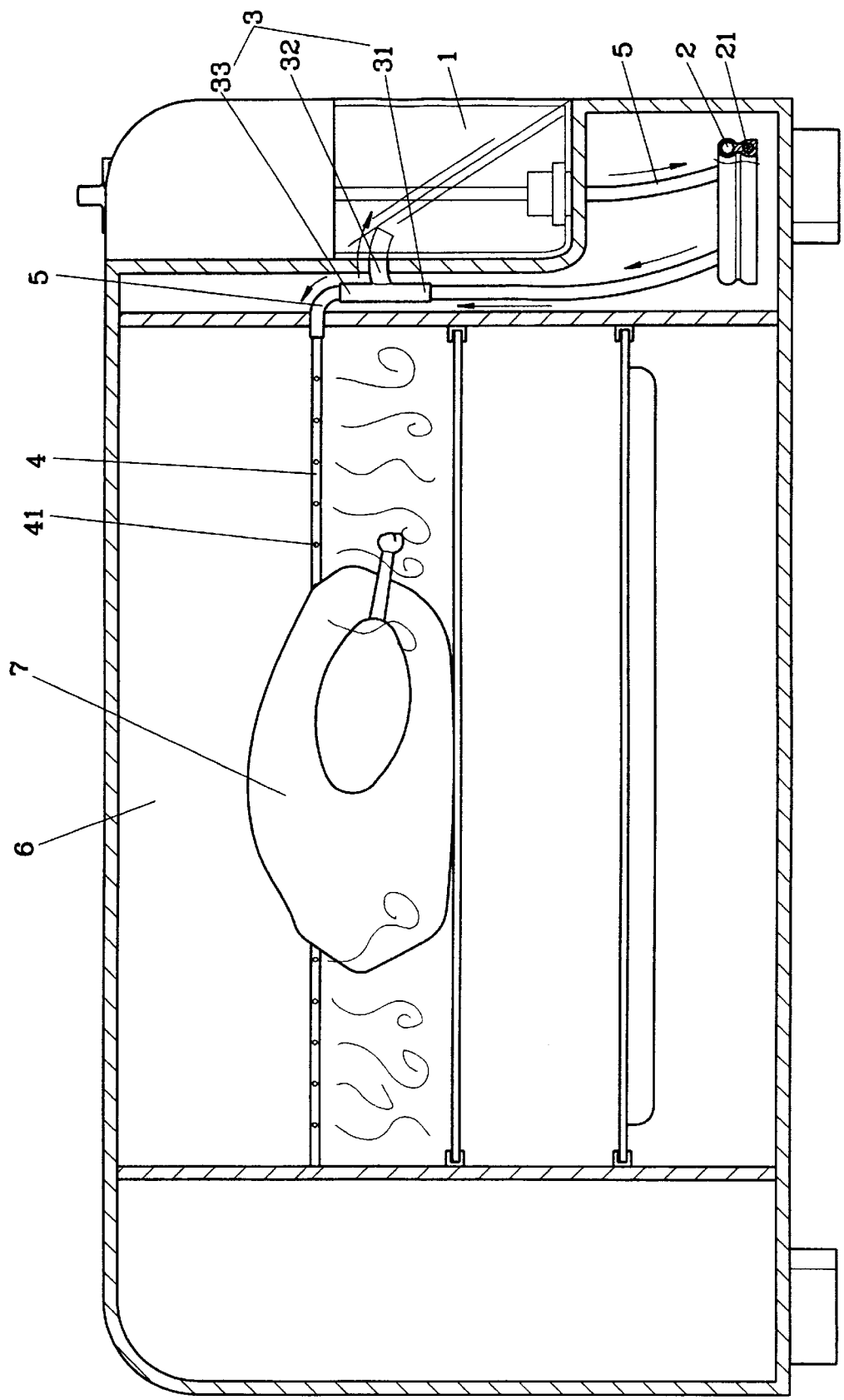
FIG. 2 is a view similar to FIG. 1 showing a food is heating in the present invention.

To operate, as shown in FIG. 2, after the heater 21 of the heating pipe 2 vaporized the water, the vapor goes through the third end 33 of the universal coupling 3 into the nozzle pipe 4 and spreading into the oven 6 through the holes 41. Meanwhile, the freeze water drops are retrieved from the second end 32 of the universal coupling 3 back into the reservoir 1. In this case, the humidity in the oven 6 is adjustable to an appropriate degree, so that food, such as chicken 7, as shown in FIG. 2, will be evenly cooked and still have the watery appearance.

I claim:

1. A humidity device for an oven comprising a reservoir attached to an oven, a heating pipe, a universal coupling and a nozzle pipe located in said oven, and the improvements comprising:

said heating pipe having one end connected to the bottom of said reservoir and the other end of which connected to a first end of said universal coupling, a second end of said universal coupling being connected to the top of said reservoir, while a third end of said universal coupling being connected to said nozzle pipe, wherein a heater of said heating pipe vaporized water flows within said heating pipe and sends said vapor through said third end of said universal coupling into said nozzle pipe and spreading into said oven through holes of said nozzle pipe, and wherein freeze water drops are retrieved from said second end of said universal coupling back into said reservoir.

2. The humidity device for an oven, as recited in claim 1, wherein said third end of said universal coupling located above said first end thereof.

3. The humidity device for an oven, as recited in claim 1, wherein said second end of said universal coupling located above the side of said first end thereof.

* * * * *